Sept. 6, 1955   L. REINGOLD ET AL   2,716,863
CONTINUOUS FLOW AND INTERNAL COMBUSTION ENGINES, AND
IN PARTICULAR TURBO-JETS OR TURBO-PROPS
Filed July 3, 1951   3 Sheets-Sheet 1

INVENTORS
Lucien Reingold
Claude Fouré
BY
Bailey, Stephens and Huettig
ATTORNEYS INVENTORS
LUCIEN REINGOLD & CLAUDE FOURÉ
BY
Bailey, Stephens & Huettig
ATTORNEYS Sept. 6, 1955 L. REINGOLD ET AL 2,716,863
CONTINUOUS FLOW AND INTERNAL COMBUSTION ENGINES, AND
IN PARTICULAR TURBO-JETS OR TURBO-PROPS
Filed July 3, 1951 3 Sheets-Sheet 3

INVENTORS
Lucien Reingold
Claude Fouré
BY
Bailey, Stephens and Huettig
ATTORNEYS United States Patent Office 2,716,863
Patented Sept. 6, 1955

2,716,863

CONTINUOUS FLOW AND INTERNAL COMBUSTION ENGINES, AND IN PARTICULAR TURBO-JETS OR TURBO-PROPS

Lucien Reingold, Paris, and Claude Fouré, Becon-Courbevoie, France, assignors to Office National d'Etudes et de Recherches Aeronautiques (O. N. E. R. A.), Chatillon-sous-Bagneux, France, a society of France Application July 3, 1951, Serial No. 234,968

Claims priority, application France July 4, 1950

7 Claims. (Cl. 60—39.28)

The present invention relates to continuous flow and internal combustion engines and it is more especially, but not exclusively, concerned with turbo-jets or turbo-props, in particular for aircraft.

Its object is to provide an engine of this kind which is better adapted to meet the requirements of practice than those existing at the present time.

Preferred embodiments of the present invention will be hereinafter described with reference to the accompanying drawings, given merely by way of example, and in which:

Figs. 1 to 4 diagrammatically show, respectively in axial section on the line I—I of Fig. 2, in axial section at right angles to the preceding one, i. e. on the line II—II of Fig. 1, in cross section on the line III—III of Fig. 1 and in cross section on the line IV—IV of Fig. 1, one combustion chamber of a turbo-jet having a plurality of combustion chambers disposed to form an annular row, this turbo-jet being made according to the invention.

Figure 8:
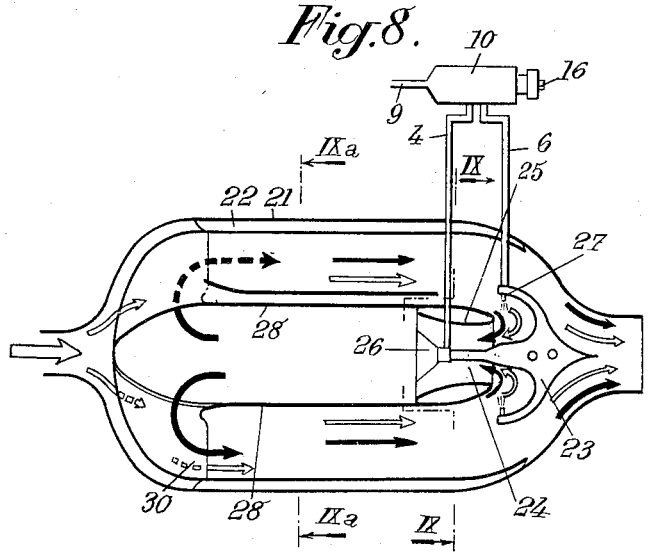
Figure 9:
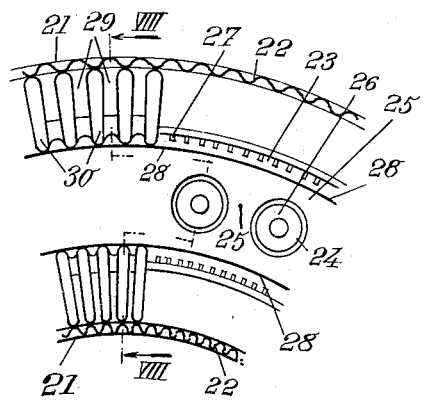

Figs. 8 and 9 diagrammatically show, respectively in longitudinal section on the line VIII—VIII of Fig. 9 and in transverse half-sections on the lines IX—IX (on the right hand side) and IXa—IXa (on the left hand side), of Fig. 8, a portion of a turbo-jet having an annular combustion chamber, said turbo-jet being made according to an embodiment of our invention.

The engine according to our invention, supposed to be a turbo-jet for an aircraft, includes at least one compressor for delivering air to one or several combustion chambers having their outlet connected with a turbine, the gases escaping from said turbine being discharged into the atmosphere through a jet nozzle.

It will be supposed, by way of example, that this turbo-jet includes a plurality of combustion chambers 1 distributed in an annular row about the axis of the engine and Figs. 1 to 4 of the drawings show, not the compressor and the turbine, but merely one of these combustion chambers, the flame space of which is limited by a wall 2, for instance of revolution, the flow of the gaseous stream through this combustion chamber taking place in the direction indicated by the arrow.

We provide, for igniting and stabilizing the combustion flame, a pilot combustion device 3 supplied with fuel through a conduit 4, the ignition core produced by the injector 3a of this pilot ignition device being protected, in the upstream direction, by a hood, for instance of frusto-conical shape, forming a stabilizing obstacle for the flame which develops in combustion chamber 1.

We dispose, upsteam of the pilot combustion device 3, a fuel injection device 5, preferably supplied with fuel independently through a conduit 6, which injection device advantageously includes a multiplicity of outlet orifices 5a the axes of which are substantially perpendicular to the general direction of flow.

Now, according to one of the features of our invention, instead of passing through the envelope 2 which surrounds pilot burner 3 the whole of the air arriving in the direction of said envelope, we by-pass a portion of this air, at a point upstream of injection device 5 and we reintroduce into the main stream, downstream of combustion chamber 1, the portion thus by-passed which plays, with respect to the hot gases issuing from said combustion chamber, the function of diluting air.

For this purpose, for instance, envelope 2 is surrounded by a sleeve extending upstream and downstream of this envelope and forming therewith an annular passage through which the dilution air stream flows.

It will thus be possible, by suitably choosing the cross-section of annular passage 8, to obtain the best possible ratio to each other of the air and fuel flow rates.

It should be noted that this ratio is variable in accordance with the conditions of operation of the engine and that it may therefore be sometimes advantageous to provide means for adjusting the by-pass portion of air, a result which might be obtained for instance by a relative axial displacement of the pilot combustion device 3 with respect to the frusto-conical wall which advantageously surrounds it and which will be referred to hereinafter.

Figure 1:
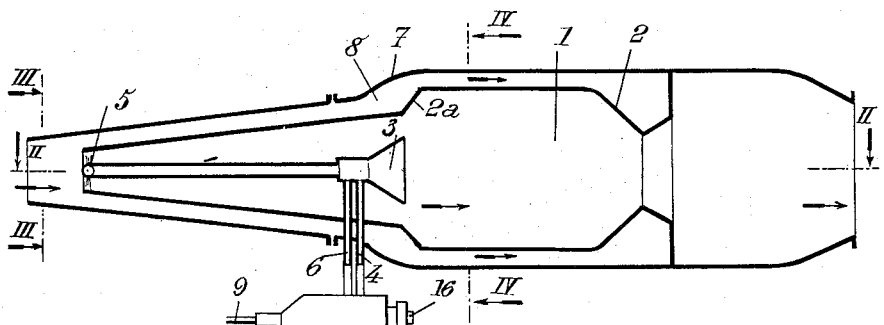
Figure 2:
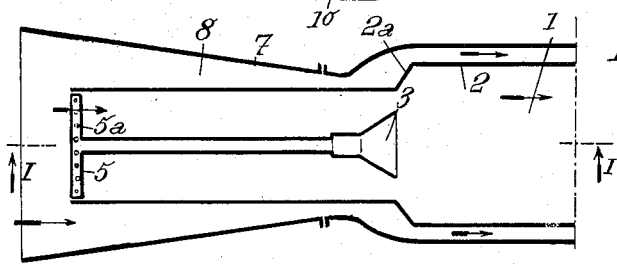
Figure 3:
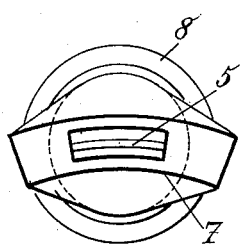
Figure 4:
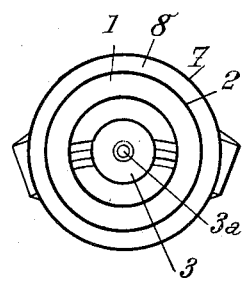

Concerning the positioning of pilot burner 3 in combustion chamber 1, it is advantageously determined, according to a particular feature of the invention, so that said burner is located substantially where the flame envelope 2 undergoes a sudden change of cross-section, for instance opposite a frusto-conical widening 2a thereof, as shown by Figs. 2 and 3.

Up to now, we have not referred to the relative proportions of fuel injected respectively in the upstream injection device 5 and in burner pilot 3.

Now, it happens that, in certain conditions of operation, it is interesting to increase the upstream injection at the expense of the pilot injection and, in other circumstances, the reverse should be done.

According to a feature of our invention, means are provided for modifying the relative fuel amounts that are delivered through conduits 6 and 4, respectively to the upstream injection device 5 and to the pilot burner 3.

This may be done in various ways but it seems particularly interesting to use, as factor of adjustment, the ratio $$\frac{A}{C}$$

of the total air and fuel weights admitted into combustion chamber 1.

It was found that there is a critical value $$\frac{A_0}{C_0}$$

of this ratio below which the operation is more advantageous with upstream injection than with injection in the pilot burner, this improvement having an influence upon the combustion efficiency R (ratio of the number of calories fed to the stream to the number of calories contained in the fuel).

This critical value is in fact higher than the value of the same ratio which is the most favorable for the combustion and it varies also with the conditions of operation.

Figure 5:
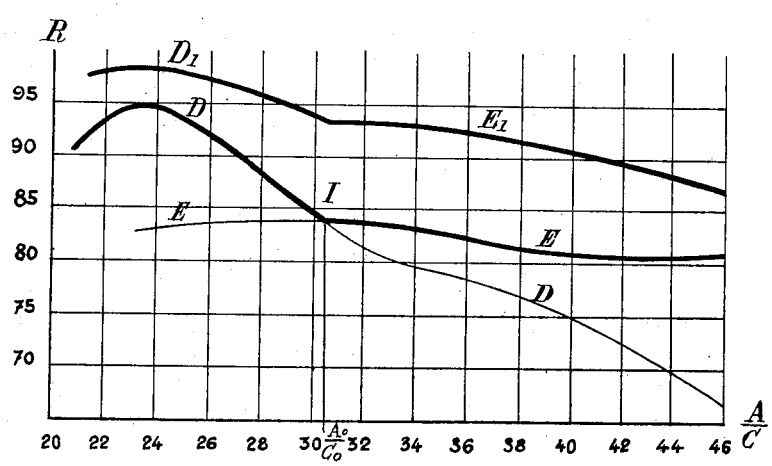
Fig. 5 is a diagram intended to facilitate the understanding of a particular feature of the invention.

In order to more clearly understand this feature, we have shown on the diagram of Fig. 5 in abscissas the values of ratio $$\frac{A}{C}$$

and in ordinates the values of the combustion efficiency R.

Curve D relates to the operation with the whole of the injection being performed upstream (the pilot burner having but a negligible output), whereas curve E concerns the case of the whole of the injection taking place in the pilot burner.

Of course, these curves vary for given temperatures and air flow rates and they depend also upon the structure of the combustion chamber. In particular, they depend upon the pressure drop that is to be permitted. In the example that is given, it is very small.

It will be seen that curves D and E intersect each other at a point I corresponding to critical value $$\frac{A0}{C0}$$

In these conditions, and supposing that the adjustment is to be either wholly with one way of injection or wholly with the other, practically the whole of the injection will be an upstream injection for values of $$\frac{A}{C}$$

lower than the critical value, while the whole of the fuel will be introduced through the pilot burner for values of said ratio higher than said critical value.

The curve representing the efficiency R will then be constituted by the solid lines portions of curves D and E (with a sharp point at I).

Many constructions may be provided for an adjustment system capable of varying as above explained the fuel distribution between the upstream injector and the pilot burner, this variation being possibly operated by the aircraft pilot, but it seems preferable to provide a control device operated automatically in the suitable direction in response to variations of ratio $$\frac{A}{C}$$

Figure 6:
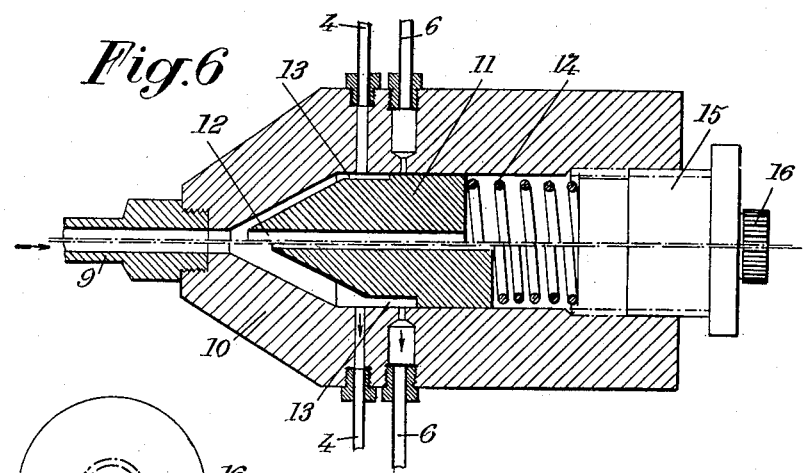
Figs. 6 and 7 show, respectively in the form of two half sections corresponding to different working conditions and in end view with parts cut away, a device for the distribution of fuel according to said feature, between the upstream injection device and the pilot combustion device of a turbo-jet made according to the invention.
Figure 7:
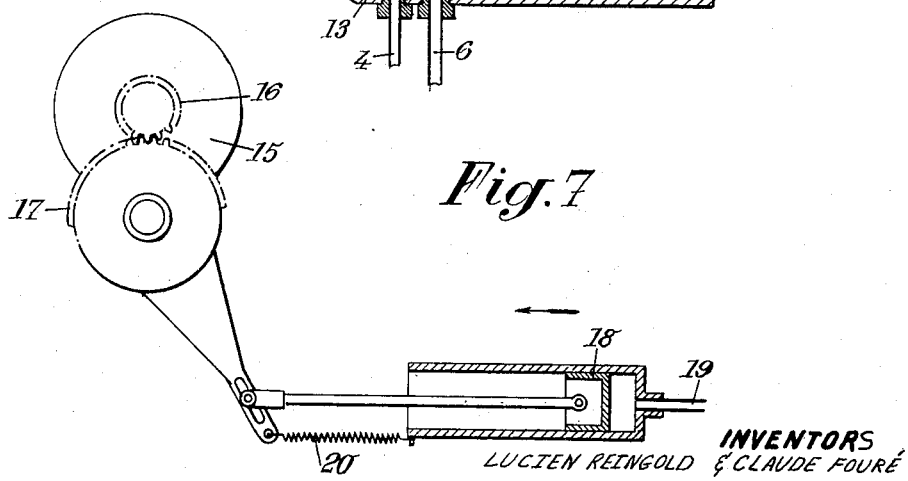

For this purpose, we make for instance use of the construction illustrated by Figs. 6 and 7. According to this construction, the delivery conduit 9 of a volumetric pump having a variable output controlled by the aircraft pilot (or by any suitable regulating system) leads to a chamber 10 in the form of a surface of revolution at the periphery of which are distributed, in two rows, the conduits 4 and 6 through which fuel is fed respectively to pilot burners 3 and upstream injectors 5.

Chamber 10 is preferably given a cylindro-conical shape, with its apex turned toward the junction of conduit 9.

A slide valve 11, also of frusto-conical shape, is mounted in this chamber, this valve being provided with a conduit 12 which serves to equalize the pressures on either side of said slide valve.

Valve member 11 is provided with longitudinal grooves 13 extending over such a length of the cylindrical portion of the slide valve that, for the end position shown on the upper half section of Fig. 6, only the conduits 4 of the pilot burners are fed with fuel, whereas, for the end position shown by the lower half-section of Fig. 6, both conduits 4 and conduits 6, corresponding with the upstream injectors are fed with fuel.

Slide valve 11 is subjected to the action of a return spring 14 which constantly urges it toward the end position for which only conduits 4 are fed with fuel, this spring 14 advantageously bearing against a threaded plug 15 which makes it possible to adjust its action.

Preferably, the angular position of plug 15 (i. e. its position about its axis) is controlled through an automatic regulating system which will be more explicitly referred to hereinafter.

Such a system works as follows:

Due to the fact that the pressures on the opposite faces of slide valve 11 are equal, this valve assumes a position of equilibrium under the opposed actions of spring 14 and the dynamic effect of the jet of fuel fed through conduit 9. When the strength of this jet decreases and therefore when the total amount of fuel that is injected decreases, slide valve 11 tends to move toward the left hand side position, for which the whole of the feed takes place through the pilot burners. This kind of feed is in fact that which is to be obtained in this case since, provided that the air flow rate has not changed, ratio $$\frac{A}{C}$$

has increased.

Rotation of plug 15 makes it possible to adjust the strength of spring 14 so that injection through only the pilot burners takes place when ratio $$\frac{A}{C}$$

is higher than the critical value $$\frac{A0}{C0}$$

When, on the contrary, the ratio in question drops below this limit value, slide valve 11 moves toward the right, the upstream injection system is supplied with fuel and, as the fuel pressure suddenly drops, only a very small amount of fuel flows through conduits 4, just sufficient to keep a small flame on pilot burners 3.

Concerning now the means for automatically regulating the pressure of plug 15, they may be constituted for instance, as shown by Fig. 7, by subjecting this plug, through gears 16 and 17, to the action of a piston 18 which itself undergoes the pressure of the air at the outlet of the compressor, transmitted through a conduit 19, a return spring 20 opposing the effects of increases of this pressure.

Owing to a suitable choice of the transmission means and of the direction of the screw threads, when the air pressure increases and tends to move piston 18 in the direction of the arrow, plug 15 turns in the direction corresponding to an increase of the strength of spring 14 and, consequently, to the movement of the slide valve toward the position for which the fuel feed is obtained exclusively through the pilot combustion device (ratio $$\frac{A}{C}$$

is in fact increased due to the air pressure increase).

We will now describe the construction of a turbo-jet having an annular combustion chamber provided with a plurality of burners distributed annularly, this engine embodying the complementary feature of our invention which consists in recycling a portion of the burnt gases, which makes it possible to increase the combustion efficiency (curve $D_1$ $E_1$ on the diagram of Fig. 5).

According to this embodiment, illustrated by Figs. 8 and 9, an annular combustion chamber, limited by walls 21 advantageously protected, at least partly, by a corrugated iron sheet 22, is fed from a compressor (not shown) disposed along the axis of the engine.

We provide, inside this annular chamber, a circular piece 23, in the form of one half of a tore, and having its concavity turned in the upstream direction, this piece deflecting back a mixture of air, hot gases, and fuel toward a series of cylindrical conduits 24 provided at the periphery of a circular piece 25 and each of which supplies a pilot burner 26.

We provide, along the edges of the semi-toric piece 23, two rows of injectors 27 playing the part of upstream injectors.

The flame zone is limited by two cylindrical walls 28 forming an annular space between them.

Between wall 21 and the walls 28 which face it, there is provided a set of longitudinal partitions which limit a plurality of thin channels some of which, 29, are reserved for the circulation of dilution fresh air and the others, 30, which communicate with the flame zone, serve to the circulation of the hot gases issuing from said zone.

In order to facilitate a good understanding of the circulation of the gaseous streams, we have shown, on Fig. 8, by black arrows the circulation of hot gases, by white arrows the circulation of fresh air and by dotted arrows (either black or white) the circuits hidden by a wall.

With a turbo-jet made according to our invention, the combustion chamber is very short while making it however possible to obtain in satisfactory conditions a mixture of hot gas and dilution air with very low pressure drops, which constitutes one of the advantages of the invention. This mixture is obtained by mixing a very thin parallel jets.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A continuous flow and internal combustion engine including at least one combustion chamber, means for feeding a stream of air to the inlet of said chamber, a pilot combustion device for igniting the fuel and stabilizing the flame located in said chamber, a device, located upstream of said pilot device in said chamber, for injecting fuel into a portion of the air stream fed to said chamber, means for feeding fuel to both of said devices, valve means for adjusting the ratio of the amount of fuel fed to said pilot device to the total amount of fuel fed to both of said devices, said last mentioned means being arranged always to supply at least a minimum fuel feed to said pilot device, and means for by-passing, upstream of said fuel injecting means, another portion of the air stream fed to said chamber and reintroducing said by-passed air portion into said chamber downstream of the combustion zone thereof.

2. A continuous flow and internal combustion engine which comprises, in combination, at least one combustion chamber, means for feeding a stream of air to the inlet of said chamber, partition means in said chamber forming therein at least one flame tube having its inlet downstream of the inlet of said combustion chamber and its outlet upstream of the outlet of said combustion chamber, whereby a by-passed air stream portion flows around said flame tube and mixes with the hot gas issuing therefrom to dilute said gas and reduce its temperature, said flame tube having a neck of restricted cross section and the cross section area of said tube increasing gradually from said neck to a transverse plane located downstream thereof, deflector means located in the vicinity of said transverse plane and including at least one member symmetrical about an axis parallel to the longitudinal direction of said flame tube, a pilot fuel injecting device constituted by at least one pilot fuel injector symmetrical about said axis and opening into the wake of said deflector means, means for igniting the fuel flowing out from said injector, a fuel injecting device located substantially in said neck of said flame tube and including a multiplicity of fuel discharge orifices, and valve means for adjusting the ratio of the amount of fuel fed to said pilot device to the total amount of fuel fed to both of said fuel injecting devices, said last mentioned means being arranged always to supply at least a minimum fuel feed to said pilot device.

3. An engine according to claim 2 in which the cross section of said flame tube suddenly increases in the downstream direction in the vicinity of said transverse plane.

4. An engine according to claim 2 in which said deflector member is a hollow conical member having its apex turned toward the inlet of said flame tube.

5. An engine according to claim 2 in which said valve means are responsive both to variations of the mass flow rate of the air stream fed to said combustion chamber and to variations of said total amount of fuel fed to both of said fuel injecting devices but nonresponsive to variations of the feed pressure of said fuel to increase said ratio in response to an increase of the ratio of said air flow rate to said total fuel feed.

6. A continuous flow and internal combustion engine which comprises, in combination, at least one combustion chamber, means for feeding a stream of air to the inlet of said chamber, partition means in said chamber forming therein at least one flame tube having its inlet downstream of the inlet of said combustion chamber and its outlet upstream of the outlet of said combustion chamber, whereby a by-passed air stream portion flows around said flame tube and mixes with the hot gas issuing therefrom to dilute said gas and reduce its temperature, said flame tube having a neck of restricted cross section and the cross section area of said tube increasing gradually from said neck to a transverse plane located downstream thereof, deflector means located in the vicinity of said transverse plane and including at least one member symmetrical about an axis parallel to the longitudinal direction of said flame tube, a pilot fuel injecting device constituted by at least one pilot fuel injector symmetrical about said axis and opening into the wake of said deflector means, means for igniting the fuel flowing out from said injector, a fuel injecting device located substantially in said neck of said flame tube and including a multiplicity of fuel discharge orifices, means forming a fuel distribution chamber, a source of fuel under pressure connected with said fuel distribution chamber for feeding a stream of fuel thereinto, two conduits leading from said fuel distribution chamber to said pilot fuel injecting device and to said other fuel injecting device respectively, and valve means in said fuel distribution chamber adapted to cooperate with the respective openings of said conduits to open either only the opening of the conduit leading to said pilot fuel injecting device or both of said conduit openings, said valve means being responsive to variations of the pressure of the air stream fed to the inlet of said combustion chamber and to variations of the dynamic thrust of the fuel stream fed to said fuel distribution chamber to open both of said conduits for values of the ratio of the flow rate of the air stream fed to the inlet of said combustion chamber to the flow rate of the fuel stream fed to said distribution chamber at least equal to a predetermined critical value.

7. An engine according to claim 6 in which said valve means comprises a slide valve movable along said openings, the opening of the conduit leading to said second mentioned fuel injecting means being narrow in the direction of displacement of said slide valve.

References Cited in the file of this patent

UNITED STATES PATENTS

| | | |
|---|---|---|
| 2,458,600 | Imbert et al. | Jan. 11, 1949 |
| 2,516,910 | Redding | Aug. 1, 1950 |
| 2,520,388 | Earl | Aug. 29, 1950 |
| 2,543,366 | Haworth et al. | Feb. 27, 1951 |
| 2,552,851 | Gist | May 15, 1951 |